US011881349B2

(12) United States Patent
Sahu et al.

(10) Patent No.: US 11,881,349 B2
(45) Date of Patent: Jan. 23, 2024

(54) WINDING, A TRANSFORMER AND A TRANSFORMER ARRANGEMENT

(71) Applicant: HITACHI ENERGY LTD, Zürich (CH)

(72) Inventors: Kiran Chandra Sahu, Västerås (SE); Anders Daneryd, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/236,736

(22) Filed: Aug. 22, 2023

(65) Prior Publication Data

US 2023/0395314 A1 Dec. 7, 2023

Related U.S. Application Data

(63) Continuation of application No. 18/035,002, filed as application No. PCT/EP2022/053428 on Feb. 11, 2022.

(30) Foreign Application Priority Data

Feb. 11, 2021 (EP) .................................... 21156699

(51) Int. Cl.
*H01F 27/33* (2006.01)
*H01F 27/30* (2006.01)
*H01F 27/28* (2006.01)

(52) U.S. Cl.
CPC ......... *H01F 27/33* (2013.01); *H01F 27/2828* (2013.01); *H01F 27/306* (2013.01)

(58) Field of Classification Search
CPC ..... H01F 27/33; H01F 27/2828; H01F 27/306
See application file for complete search history.

(56) References Cited

U.S. PATENT DOCUMENTS 3,309,639 A * 3/1967 Goolsby, Jr. ............ H01F 27/33 336/100
3,786,387 A * 1/1974 Hori ........................ H01F 27/33 336/212

(Continued)

FOREIGN PATENT DOCUMENTS

CN 110415942 A * 11/2019
EP 2602799 A1 * 6/2013 ........... H01F 27/306

(Continued)

OTHER PUBLICATIONS

International Search Report and Written Opinion of the International Searching Authority, PCT/EP2022/053428, dated May 19, 2022, 38 pages.

(Continued)

*Primary Examiner* — Bickey Dhakal
*Assistant Examiner* — Malcolm Barnes
(74) *Attorney, Agent, or Firm* — Sage Patent Group

(57) ABSTRACT

A winding for a phase winding of a transformer. The winding has coil turns around a coil axis. The winding is adapted to transform voltage in a transformer at a predetermined frequency, when the transformer is operating. The winding is excited by a mechanical load having a main frequency corresponding to the predetermined frequency multiplied by two and has vibration modes. The combination of load and vibration modes results in a vibration of the winding. The winding has a set of vibration modes. Each vibration mode has a vibration mode frequency, wherein a main contributing vibration mode of the set of vibration modes is the vibration mode resulting in the largest acoustic power of the vibration modes. The winding is excited by the load and a stiffness difference between a first winding portion stiffness and a second winding portion stiffness is (Continued)

such that the acoustic power is minimized at said main frequency.

8 Claims, 5 Drawing Sheets

(56) References Cited

U.S. PATENT DOCUMENTS

| | | | | |
|---|---|---|---|---|
| 3,815,068 | A * | 6/1974 | Hori | H01F 27/33 336/224 |
| 9,020,156 | B2 | 4/2015 | Dantele et al. | |
| 2015/0170826 | A1* | 6/2015 | Lau | H01F 27/2823 336/220 |

FOREIGN PATENT DOCUMENTS

| | | | | | |
|---|---|---|---|---|---|
| JP | 2008153513 | A | | 7/2008 | |
| JP | 2013183151 | A | * | 9/2013 | |
| JP | 2013183151 | A | | 9/2013 | |
| WO | WO-02063605 | A1 | * | 8/2002 | G10K 11/1788 |

OTHER PUBLICATIONS

International Preliminary Report on Patentability, PCT/EP2022/053428, dated Jan. 24, 2023, 17 pages.
Decision for Grant of Patent for Korean Patent Application No. 10-2023-7022381, dated Nov. 7, 2023, 5 pages.

* cited by examiner

WINDING, A TRANSFORMER AND A TRANSFORMER ARRANGEMENT

CROSS REFERENCE TO RELATED APPLICATIONS

This application is a continuation of Ser. No. 18/035,002 filed May 2, 2023 which is a 35 U.S.C. § 371 national stage application of PCT International Application No. PCT/EP2022/053428 filed on Sep. 17, 2020, which in turn claims priority to European Patent Application No. 21156699.7, filed on Feb. 11, 2021, the disclosures and content of which are incorporated by reference herein in their entireties.

TECHNICAL FIELD

The present disclosure relates to a winding for a transformer. The disclosure also relates to a transformer comprising such a winding, and to a transformer arrangement comprising such a transformer.

BACKGROUND

Transformers, as any other industrial products, may be subject to various requirements on noise levels. It is known to people skilled in the art that the acoustic power P emitted from a vibrating structure acted upon by forces F can be expressed as:

$$P=F^H\Phi B_{F\Phi}\Phi^T F$$

in which Φ represents the collection of mode shapes associated with the mechanical properties of the structure, and the operator $B_{F\Phi}$ implicitly depends on the geometry of the structure, the frequency, and also materials properties of the acoustic and structural media in question. Furthermore, H denotes the Hermitian transpose of the vector, and T denotes a regular vector transposition. The quantity $\Phi^T$F is here to be interpreted as the scalar or dot product of the two vectors, indicating that when these two vectors are orthogonal, the resulting acoustic power goes to zero. This orthogonality is in this disclosure proposed to be brought about by promoting asymmetric winding resonance modes which are acted upon by the inherently symmetric force distributions. Regardless of the actual proximity of the frequency of the mode to the double the network frequency, the resulting acoustic power is reduced.

In more detail, the equation of motion for a mechanical assembly, in this context typically a winding with supporting structures or a set of such windings, is in numerical approaches generally expressed as:

$$M\ddot{u}+C\dot{u}+Ku=F$$

in which u is the displacement vector, M, C, K, are the system mass, damping, stiffness, matrices, respectively, and F the force vector.

Based on the above system matrices and introducing in a well-known manner the system mode shapes Φ and modal coordinates z, $$u=\Phi z, \Phi=[\varphi_n], n=1, \ldots, N$$

it is equally well known that the frequency domain modal displacement $z_n$ at frequency ω is given by:

$$z_n=\frac{\varphi_n^T F}{\omega_n^2-\omega^2+j2\omega\omega_n\xi_n},$$

such that the modal displacement component $u_{mn}$—arbitrary location m in the winding, mode n—can be expressed as $$u_{mn}=\varphi_{mn}z_n=\varphi_{mn}\frac{\varphi_n^T F}{\omega_n^2-\omega^2+j2\omega\omega_n\xi_n}, m=1, \ldots, M$$

Here, the parameter $\xi_n$ denotes the damping ratio (fraction of critical damping), and for further clarity the quantity $u_m$ is expressed as a summation over the system modes according to $$u_m(\omega)=\sum_n \varphi_{mn}\frac{\varphi_n^T F}{\omega_n^2-\omega^2+j2\omega\omega_n\xi_n}$$

Further studying the fraction in this expression, the classical approaches to mitigate noise and vibrations can readily be discussed. When the driving frequency ω is close to a resonance frequency $\omega_n$, or a narrow set of such frequencies, the structural responses $x_m$ might grow beyond permissible levels, and the commonplace methods to alleviate this effect are:

- finding ways to increase the damping, dissipation of vibrational energy, $\xi_n$, and/or
- changing the resonance frequencies $\omega_n$ by changing the stiffness and/or mass of the mechanical assembly, and/or
- reducing the magnitude of the force, F, acting on the assembly, or otherwise redirect its action.

Furthermore, the second commonplace method of changing the resonance frequencies might lead to resonance phenomena controlled by the new resonances which will inevitably appear close to the exciting frequency 6. In fact, in the transformer noise context, it is important to also pay close attention to winding dynamics during short-circuit events, in that here the mechanical frequency content during a few cycles of the network frequency (usually, but not limited to, 50 or 60 Hz) varies between the network frequency and two times the same. The latter being the steady state driving frequency ω implicitly assumed in the above theory background. In other words, shifting resonances generally has to be executed with great care for ensuring the integrity of the transformer system as a whole.

Finally, the electromagnetic force distributions acting on the winding conductors should be considered as givens with few design degrees of freedom for controlling noise.

SUMMARY

Therefore, an object of the disclosure is to provide an improved winding for a transformer. More specifically, an object of the disclosure is to provide a winding having appropriately low noise emissions and which is cost-effective to build and assemble. Another object of the disclosure is to provide a transformer comprising such a winding and a transformer arrangement comprising such a transformer in a transformer tank.

According to a first aspect of the disclosure, the object is achieved by a winding for a phase winding of a transformer. The winding has coil turns around a coil axis. The winding is adapted to transform voltage in a transformer at a predetermined frequency, when the transformer is operating. The winding is excited by a mechanical load having a main frequency corresponding to the predetermined frequency multiplied by two and having vibration modes. The combination of load and vibration modes results in a vibration of the winding. The winding has a set of vibration modes, each vibration mode having a vibration mode frequency wherein at least one main contributing vibration mode of the set of vibration modes is the vibration mode resulting in the largest acoustic power, of the vibration modes, when the winding is excited by the load. The winding comprises a plurality of winding portions, the plurality of winding portions comprising at least a first winding portion and a second winding portion. The first winding portion has a first winding portion stiffness, and the second winding portion has a second winding portion stiffness. A stiffness difference between the first winding portion stiffness and the second winding portion stiffness is such that the acoustic power is minimized at said main frequency.

For the sake of clarity, the present disclosure does not make any further reference to the controlling of resonances a), for noise minimization, or any of the other classical approaches discussed in the background section above.

A vibration mode of the winding describes the deformation that the winding would show when vibrating at the natural frequency during excitation under load. The set of vibration modes thus indicates how the winding behaves under a dynamical load, such as when excited by an oscillating electromagnetic field generated by the alternating current at the predetermined frequency. The vibration modes determine the acoustic power of the winding, e.g. how much air/oil is displaced during vibration, and consequently how efficiently noise is generated by the winding at the mechanical main frequency. The acoustic power of the winding in turn affects the acoustic power of a transformer in which the winding is comprised.

The predetermined frequency may for instance be 50 Hz or 60 Hz. At these frequencies, the corresponding main frequencies of vibration, at which the winding is operating, thus become 100 Hz or 120 Hz, respectively.

The at least one main contributing vibration mode is, as outlined above, the vibration mode contributing to the highest acoustic power, when the winding is excited by the load at the main frequency. The acoustic power generated by the winding, and consequently noise generation, may thus be reduced when the winding is adapted such that the dot products $\varphi_n^T F$ of a winding approach zero. By way of example, the mode shapes in a structure may be modified by adapting the mass and/or the elasticity of the structure. However, it is also envisaged that other characteristics of the winding may have an impact on the mode shapes. In the present disclosure case, the structure is exemplified by a winding, a transformer and/or a transformer tank.

Generally, the object is achieved by focusing on the nominator of the governing fraction given in the background section above, in that the dot products $\varphi_n^T F$ are optimized to approach zero, regardless of the properties of the mechanisms being represented by the terms forming the denominator. Thus, the structural vibrations can be controlled for low noise performance.

The term "winding" is herein used to denote a single winding of a phase winding of a transformer, such as an inner winding or an outer winding, a low voltage winding or a high voltage winding, etc.

By the provision of a winding as disclosed herein, the vibration modes may be changed by modifying the elasticity, i.e., stiffness, of the winding. Providing winding portions of different winding portion stiffnesses is a convenient and cost-effective way of modifying the main contributing mode shape, from a symmetric mode shape to an asymmetric mode shape, as discussed hereinabove.

Optionally, the first winding portion has a first winding portion stiffness, as seen along the coil axis. The second winding portion has a second winding portion stiffness, as seen along the coil axis. The first winding portion stiffness is different from the second winding portion stiffness.

Optionally, the winding is provided with a plurality of spacers between the coil turns. The first winding portion is provided with a first spacer distribution and the second winding portion is provided with a second spacer distribution. The first spacer distribution being different from said second spacer distribution.

The symmetric force distribution of the electromagnetic load may excite large vibrations along the coil axis (first axis) of the at least one winding. Therefore, arranging the different winding portions, with different stiffnesses, along the coil axis is an efficient way of affecting the vibration mode shapes of the winding and to reduce noise of the winding at the main mechanical frequency. As non-limiting examples, stiffness of a winding may be modified by arranging the winding portions with different spacers, CTC cables and/or different stiffness distributions.

Optionally, the first type of spacers has a first modulus of elasticity and the second type of spacers has a second modulus of elasticity, said first modulus of elasticity being different from said second modulus of elasticity.

The spacers are conventionally distributed along the axial length of the winding, between the coil turns, so as to separate and electrically insulate the turns of the coil from each other. When the coil turns vibrate, the elasticity of the spacers affect the elasticity of the winding, and in turn, the transformer as a whole. Thereby, the mode shape of the at least one main contributing mode, or the symmetric mode, of the winding may be modified by providing spacers of different modulus of elasticity in different winding portions. The modulus of elasticity may for instance be selected by selecting appropriate materials for the spacers. The modulus of elasticity of selectable/applicable materials range between 0.1 GPa-120 GPa, or higher.

Apart from adapting the stiffness through the modulus of elasticity of the spacer materials, the spacers may have a structural shape to provide an increased, or a reduced, stiffness as compared to conventional spacers. Consequently, the first type and the second type of spacers might conceivably be of the same material but be provided with different shapes in order to provide at least the first and the second winding portions with different stiffnesses. However, the modification of the stiffness by the structural design of the spacers does not offer many degrees of freedom due to design requirements on windings and transformers.

Optionally, the first spacer distribution comprises spacers arranged at a first distance between each other in a direction around the coil axis and the second spacer distribution comprises spacers arranged at a second distance between each other in a direction around the coil axis, said first distance being different from said second distance.

The spacers are conventionally equidistantly distributed along the coil turns. By decreasing the distance between the spacers in, for instance, the first winding portion as compared to the second winding portion, the stiffness of the first winding portion is increased as compared to the second winding portion. Here also, the degrees of freedom may be limited due to design requirements on windings and transformers. A reduced distance between the spacers reduces the cooling efficiency of the electrically insulating liquid in which the winding (transformer) is immersed in a transformer tank.

Optionally, the first winding portion is located at a different axial position as seen along the coil axis in relation to the second winding portion.

The winding may have the first winding portion and the second winding portion in different positions along an axial length of the coil axis. The winding may, for instance, be divided into axial sections corresponding to the winding portions. The first winding portion may also have a different axial length as compared to the second winding portion. As disclosed hereinabove, the provision of a first winding portion whose mass or stiffness differs from the second winding portion modifies the main contributing mode, or the symmetric mode, of the transformer so as to reduce vibrations and noise at the main frequency. Arranging the first winding portion and the second winding portion in different positions along an axial length of the coil axis is a way of breaking the structural symmetry of the winding.

Optionally, the first winding portion is located in a different sector of the winding than the second winding portion.

By a sector of the winding is herein meant a winding portion delimited by a circumferential arc length around the coil axis and an axial length along the coil axis of the winding. The arc length is determined by a central angle $\alpha$ at the coil axis, between two radii extending between the coil axis and the coil turns of the winding portion. The winding may, for instance, be divided into sectors corresponding to the winding portions. The first winding portion may also have a different arc length as compared to the second winding portion. As disclosed hereinabove, the provision of a first winding portion whose mass and/or stiffness differs from the second winding portion modifies the vibration mode shape of the at least one main contributing mode, or the symmetric mode, of the transformer so as to modify the vibration mode shape towards an asymmetric mode and to reduce vibrations and noise at the main frequency.

According to a third aspect of the present disclosure there is provided a transformer comprising at least one winding according to any one of the previous claims.

When the transformer comprises at least one winding according to the present disclosure, the acoustic power of each winding may either reduce the acoustic power of the transformer as a whole, such as when at least one of three windings is in accordance with the present disclosure.

According to a fourth aspect of the disclosure there is provided a transformer arrangement comprising the transformer in accordance with the third aspect, wherein the transformer is enclosed in a transformer tank.

The transformer may be immersed in an electrically insulating medium, such as oil, in the transformer tank. By the provision of at least one winding according to the disclosure, the at least one main contributing mode, or the symmetric mode, of the transformer may be modified to reduce vibration and noise of the transformer. Consequently, such a transformer in a transformer tank will cause the transformer tank walls to generate less noise.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION

The present disclosure is developed in more detail below referring to the appended drawings which show examples of embodiments. The disclosure should not be viewed as limited to the described examples of embodiments; instead, it is defined by the appended patent claims. Like numbers refer to like elements throughout the description.

Figures 1, 2, 3:
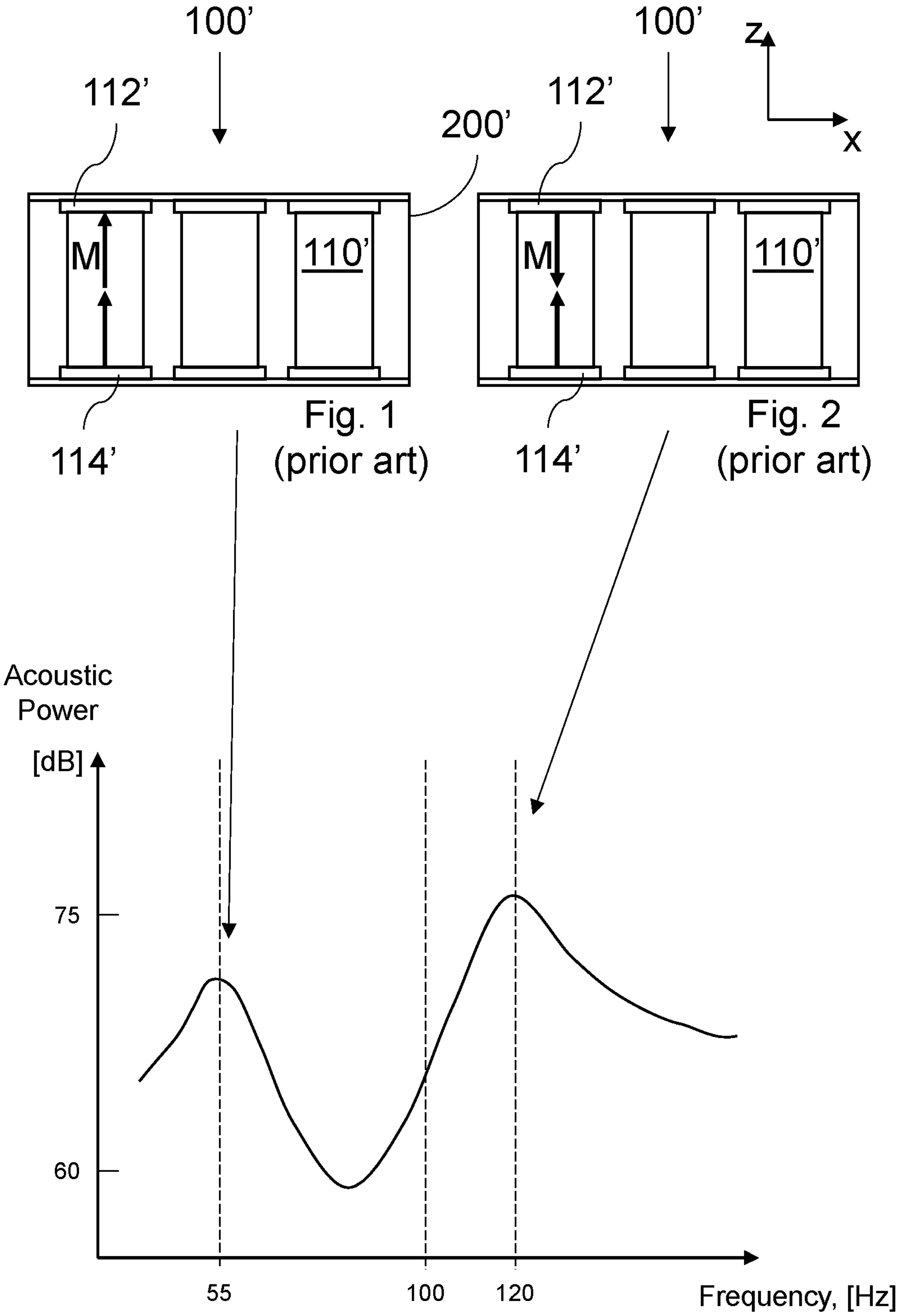
Fig. 1 (prior art)
Fig. 2 (prior art)
Fig. 3 (prior art)
FIG. 1 shows a side view cross-section of an exemplary prior art transformer in an asymmetric vibration mode.
FIG. 2 shows a side view cross-section of the prior art transformer of FIG. 1; in a symmetric vibration mode.
FIG. 3 shows the noise power generated by the prior art transformer of FIG. 1 and FIG. 2 at predetermined frequencies.

FIG. 1 and FIG. 2 show side view cross-sections of an exemplary prior art windings 110' in a transformer 100' under different vibration modes. The prior art winding 110' has a first extension along a first axis z, a second extension along a second axis x and a third extension along a third axis y (not shown). The first, second and third axes are perpendicular to each other. The prior art winding 110' is further exemplified as comprised in a transformer having three identical windings 110' being located at a distance from each other as seen along said second axis (x). The transformer 100' may have a phase winding for each phase of the transformer. Each phase winding may comprise a winding 110', such as an inner winding and an outer winding, which may be a low voltage winding and a high voltage winding, respectively.

Each winding has a first end and an opposite second end along the first axis (z). The first and second ends are respectively provided with a first pressplate 112' and a second pressplate 114', between which two pressplates the winding 110' is clamped. When the transformer 100' is in operation, electromagnetic forces and the clamping of the windings 110' between the pressplates generate load noise, which is a significant part of the total noise of transformers 100, radiated by the windings 110', especially for large units.

Symmetric movements (piston-like displacements) of a transformer tank 200', in which the transformer 100' may be enclosed, radiate significant noise to the far field as compared to asymmetric movement because symmetric vibrations displace more air outside the transformer tank 200' and thereby radiate sound more efficiently than asymmetric movements. Windings 110' under load usually vibrate at 100 Hz or 120 Hz mechanical main frequency (i.e., usually 50

Hz or 60 Hz predetermined electrical operating (excitation) frequency multiplied by two).

FIGS. 1 and 2 illustrate the movement of the pressplates 112', 114' by arrows M of the transformer 100'. For the sake of clarity, the arrows are only shown for one phase winding 110'. In practice, for the prior art transformer 100', all phase windings 110' exhibit the same vibration pattern, albeit at a 120° phase shift in relation to each other, for e.g., a three-phase transformer 100' such as shown in FIG. 1 and FIG. 2.

FIG. 3 shows how acoustic power of the transformer 100', as a result of vibrations of the windings 110', varies with frequency. The horizontal axis displays the mechanical vibration frequency. The curve represents a superposition of vibration modes of the structure of the transformer 100' as a result of vibrations of the windings 110'. The modes of interest of the transformer 100' may be identified at the peak amplitudes, where the acoustic power is largest.

Figure 4:
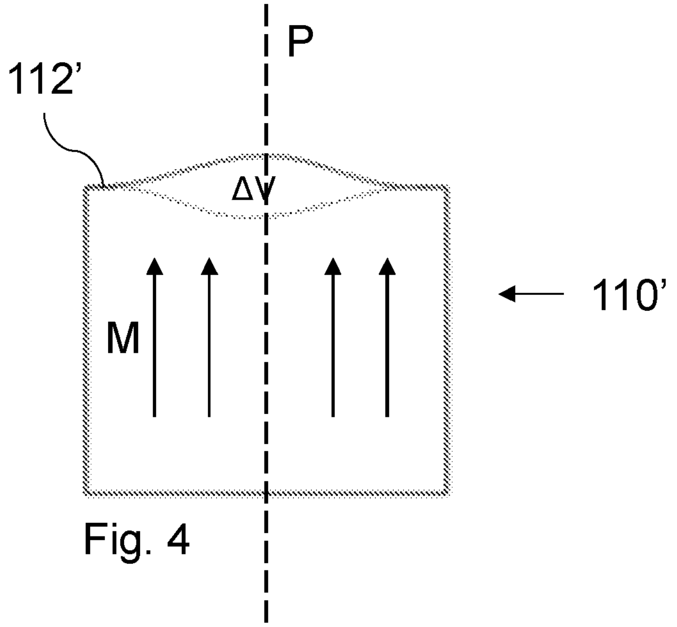
FIG. 4 illustrates the concept of noise generation in a symmetric vibration mode.
Figure 5:
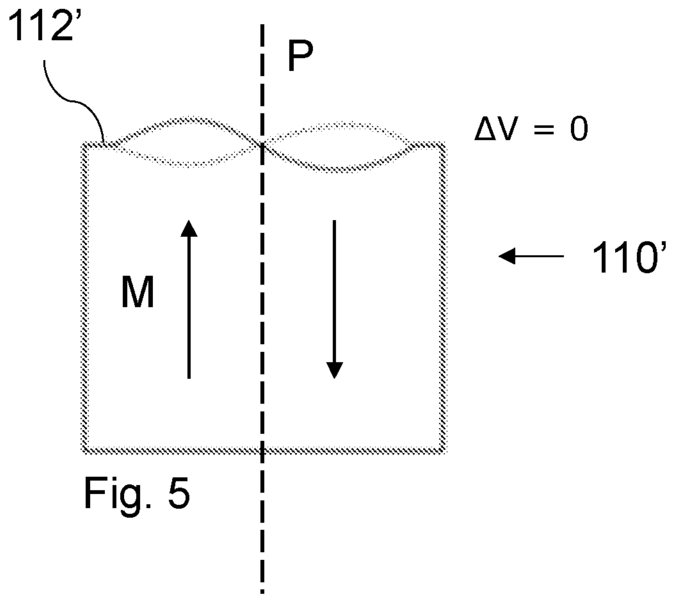
FIG. 5 illustrates the concept of noise generation in an asymmetric vibration mode.

FIG. 4 and FIG. 5 illustrate symmetric and asymmetric vibration modes, respectively and further explain the sound producing properties thereof. FIG. 4 conceptually shows a symmetric mode acting on the pressplate 112' of a winding 110' of the prior art transformer 100'. It can be seen that a certain volume of a surrounding medium, ΔV (positive or negative), such as oil or air, is displaced as the pressplate 112' vibrates. This displacement radiates noise to the audible far field, which may be perceived as disturbing noise. In contrast, the asymmetric vibration mode shown in FIG. 5 moves one part of the pressplate 112' up as another part is moved down, theoretically resulting in a net volume displacement, ΔV, equal to zero. Such an asymmetric vibration mode radiates noise to the near field, which is not audible at a distance. In other words, it is not perceived as disturbing noise. A center plane P is shown in FIG. 4 and FIG. 5. The arrows M in FIG. 4 illustrate how every portion of the winding 110', located on opposite sides of the center plane P, are displaced in the same direction at the same time for displacements in directions parallel to the center plane P. In FIG. 5 the asymmetric vibration mode results in opposing directions on opposite sides of the center plane P.

Figure 6:
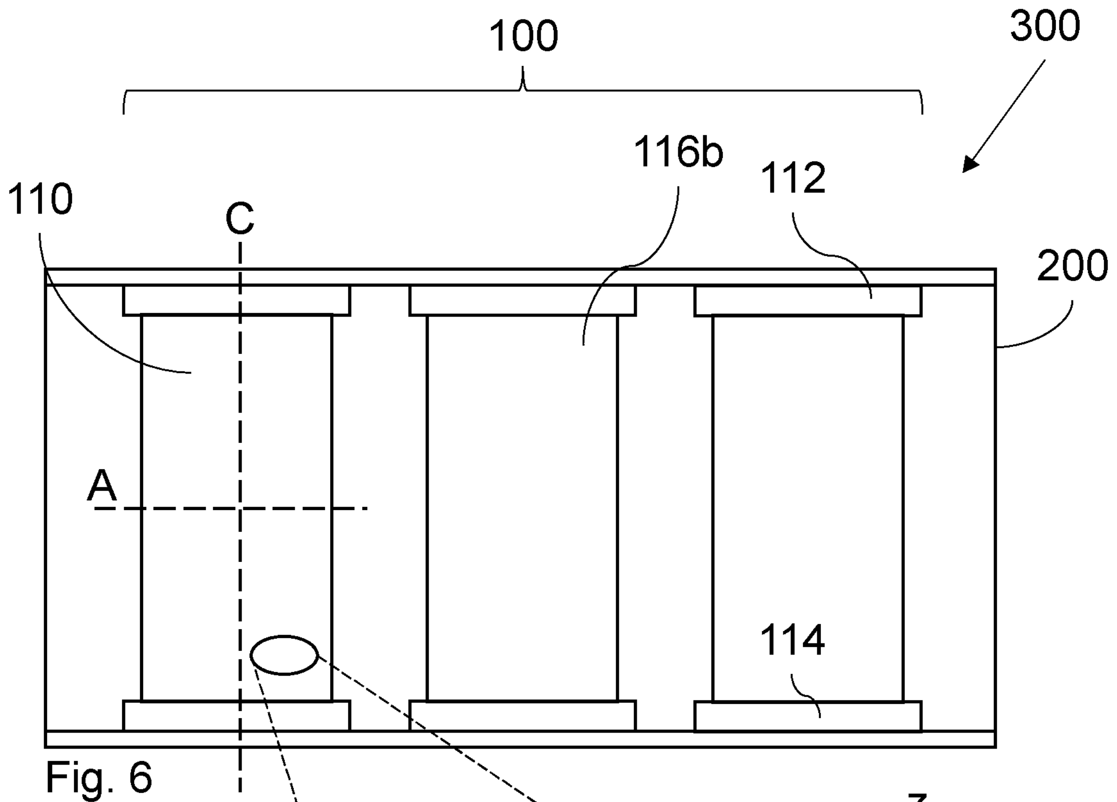
FIG. 6 shows a side view cross-section of an exemplary winding according to the present disclosure, comprised in a transformer.

FIG. 6 shows a side view cross-section of an exemplary winding 110, according to the present disclosure, comprised in a transformer 100. The transformer 100 may have a phase winding for each phase of the transformer. Each phase winding may comprise at least one winding 110, such as an inner winding 110 and an outer winding 110, which may be a low voltage winding and a high voltage winding, respectively. The illustrated exemplary transformer comprises three phase windings, each comprising windings 110 according to the present disclosure. For the sake of simplicity, and since the effect of the present invention may be achieved by modification of a single winding 110 comprised in a phase winding, the term winding 110 is hereafter used to denote a single winding of a phase winding of a transformer 100. Each winding 110 has coil turns 120 (FIG. 7) around a coil axis (z). The transformer 100 is adapted to transform voltage at a predetermined frequency, when the transformer 100 is operating. The winding 110 is excited by a mechanical load having a main frequency corresponding to the predetermined frequency multiplied by two and having vibration modes. The combination of load and vibration modes results in vibration of the winding 110. The winding 110 further has a set of vibration modes, each vibration mode having a vibration mode frequency, where a at least one main contributing vibration mode of the set of vibration modes is the vibration mode which results in the largest acoustic power, of the vibration modes, when the winding 110 is excited by the load. The winding 110 comprises a plurality of winding portions 116. The plurality of winding portions 116 comprises at least a first winding portion **116*a* and a second winding portion 116*b*. The first winding portion 116*a* has a first winding portion stiffness and the second winding portion 116*b*** has a second winding portion stiffness. A stiffness difference between said first winding portion stiffness and said second winding portion stiffness is such that the acoustic power is minimized at said main frequency.

Figure 7:
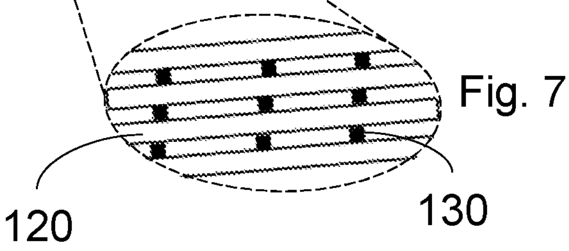
FIG. 7 is detailed view of coil turns and spacers of the winding of FIG. 6.

FIG. 7 shows a magnified detail of the coil turns 120 of a winding 110. The winding 110 is provided with a plurality of spacers 130 between the coil turns 120. The spacers are conventionally distributed along the axial length of the winding 110, between the coil turns, so as to separate and electrically isolate the turns of the coil from each other.

The winding 110 further has a first extension along a first axis z. The coil axis is parallel to the first axis z. The winding 110 has a second extension along a second axis x and a third extension along a third axis y (see FIG. 8). The first, second and third axes are perpendicular to each other and the centers of the illustrated windings 110 are located at a distance from each other as seen along the second axis x. The winding 110 comprises a first center plane A which extends along the second axis x and third axis y and splits the winding 110 in half, as seen along the first axis z. The winding 110 comprises a secondcenter plane B (see FIG. 8) which extends along the second axis x and first axis z and splits the winding 110 in half, as seen along the third axis y. The winding 110 comprises a third center plane C which extends along the third axis y and first axis z and splits said winding 110 in half, as seen in along the second axis x.

Each winding 110 may have a first end and an opposite second end along the coil axis, i.e., parallel with the first axis z. The first and second ends are respectively provided with a first pressplate 112 and a second pressplate 114, between which two pressplates the winding 110 is clamped.

A symmetric mode of mechanical vibration of said winding 110 results in that every portion of said winding 110, located on opposite sides of one of said center planes A, B, C, are displaced in the same direction at the same time for displacements in directions parallel to the center plane concerned. An asymmetric mode of mechanical vibration of said transformer 100 results in that every portion of said transformer 100, located on opposite sides of one of said center planes A, B, C, are displaced in the opposite direction at the same time for displacements in directions parallel to the center plane concerned.

A mode spectrum may be used to study a structure's vibration amplitude in response to different frequencies. Devices and methods for creating a mode spectrum are known to a person skilled in the art. A transformer tank wall can for instance be caused to vibrate by means of a pulse hammer and the vibrations of the tank wall can be measured by acceleration sensors or by piezoelectric force transducers that are distributed over the surface of the tank wall. The measured signals can be forwarded to a computer system which performs a modal analysis and numerically determines the dynamic characteristics of the tank wall therefrom.

As discussed in conjunction with FIGS. 1-5, the noise generating mechanism of a winding 110, is controlled by a nearly symmetric winding axial force distribution. The winding 110 of the present disclosure seeks to break this match by introducing an asymmetric vibration shape such that the dot products $\varphi_n^T F$ tend towards zero. The force distribution for a winding 110 is a given due to the structure. The shape and design of the core, the coil turns 120 and/or pressplates are presets to obtain the desired electrical performance of the transformer 100. Other properties on which winding 110 vibrations depend may, however, be modified without affecting performance. Such a property is mechanical stiffness. Another property is the mass of the windings 110. Possibilities to modify the mass may be limited due to design requirements placed on windings and transformers. For this purpose, the transformer 100 according to the present disclosure, has at least one of its windings 110 provided with the plurality of winding portions 116 having different winding portion stiffnesses.

Figure 8:
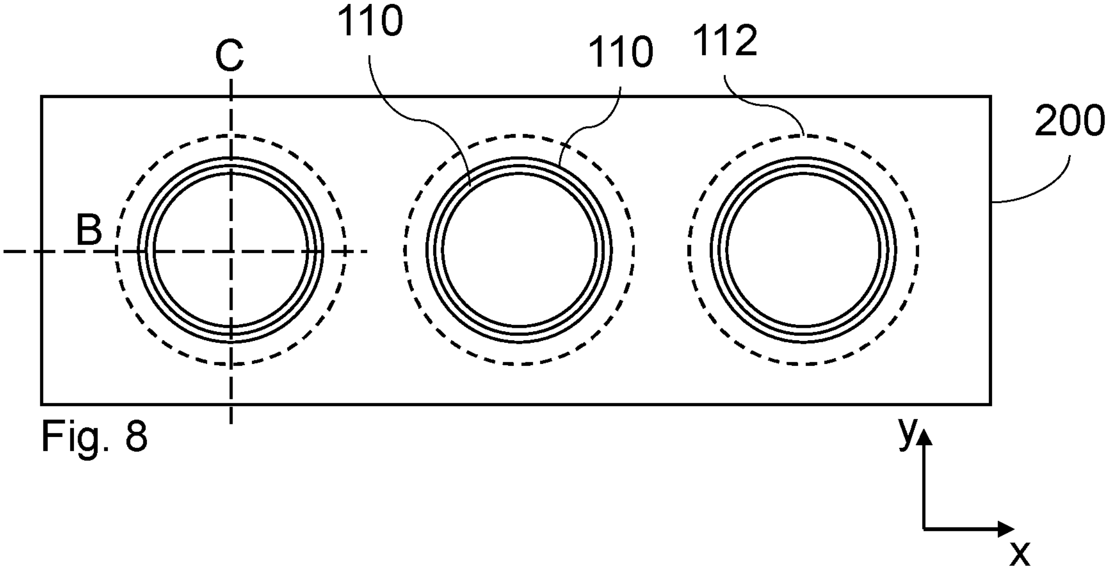
FIG. 8 shows a top view cross-section of the exemplary winding of FIG. 6 arranged in a transformer.

In the exemplary embodiment of FIG. 8, which is a top-side cross-sectional view of the windings 110 of the embodiment of of FIG. 6. Each phase winding is shown to have an inner winding 110 and an outer winding 110. The inner winding may be a low voltage winding and the outer winding may be a high voltage winding, or vice versa. Each winding 110 may have different winding portions 116.

According to the present disclosure, a winding 110 comprises at least two winding portions 116. Thus, any number of winding portions 116 greater than two is also within the scope of the disclosure.

A winding portion 116 herein means a part of the coil turns of a winding 110. A winding portion may be a part of a winding, such as an axially elongated section of a winding, limited in length along the first axis z (not shown). A winding portion may also/alternatively be a sector of a winding, limited by a center angle α to a circumferential sector arc length of the winding.

The introduction of a stiffness difference between the winding portions 116 breaks the symmetric mode of mechanical vibration and instead introduces an asymmetric mode of vibration in the winding 110 comprising the differing winding portions. As a result, the symmetric mode of mechanical vibration of the winding 110 and the transformer 100 as a whole is broken.

In a transformer 100, such as shown in FIG. 6 or FIG. 8, comprising at least one winding 110 according to the present disclosure, and in a transformer arrangement 300, such as shown in FIG. 6 or FIG. 8, comprising the transformer 100 having at least one winding 110 according to the present disclosure, enclosed in a transformer tank 200, the symmetric mode of mechanical vibration of a winding 110, and consequently of the transformer 100 and of the transformer tank 200, is broken by the introduction of the first winding portion **116*a* having a first winding portion stiffness, as seen along the coil axis z. The second winding portion 116*b*** may further have a second winding portion stiffness, as seen along the coil axis z. As before, the first winding portion stiffness is different from said second winding portion stiffness.

The first winding portion **116*a* is provided with a first spacer distribution and the second winding portion 116*b* is provided with a second spacer distribution. The first spacer distribution is different from said second spacer distribution. Choice of materials for the spacers 130 is a factor that may be used to break the symmetric mode of mechanical vibration. When the coil turns 120 vibrate, the elasticity provided by the spacers 130 affects the stiffness of the winding 110 and the transformer 100 as a whole, and thereby affects the modes of vibration of the winding 110 and the transformer 100. It should be noted that the detail of FIG. 7** only shows a part of one spacer distribution.

The first spacer distribution may comprise a first type of spacers and the second spacer distribution may comprise a second type of spacers. The first type of spacers is different from said second type of spacers. The first type of spacers may for instance have a first modulus of elasticity and the second type of spacers may have a second modulus of elasticity. The first modulus of elasticity is different from said second modulus of elasticity by at least 3 GPa, or more preferably by at least 5 GPa, such as at least 10 GPa.

The mode shape of the main contributing mode, or the symmetric mode, of the winding 110 may thus be modified by providing spacers 130 of different modulus of elasticity. The modulus of elasticity may for instance be selected by selecting appropriate materials for the spacers 130. The modulus of elasticity of selectable/applicable materials range between 0.1 GPa-120 GPa, or higher.

Alternatively, the first spacer distribution may comprise spacers arranged at a first distance between each other in a direction around the coil axis and the second spacer distribution may comprise spacers arranged at a second distance between each other in a direction around the coil axis. The first distance is different from said second distance. By decreasing the distance between the spacers in, for instance, the first winding portion as compared to the second winding portion, the stiffness of the first winding portion may be increased as compared to the second winding portion. This would mean a greater number of spacers per unit length of the coil turns 120 in the first winding portion as compared to the second winding portion.

Optionally, the first type of spacers are structurally shaped to have a first stiffness as seen along the coil axis and the second type of spacers are shaped to have a second stiffness as seen along the coil axis, said first stiffness being different from said second stiffness. The spacers 130 may have structural shapes to provide an increased, or a reduced, stiffness as compared to conventional spacers. Consequently, the first type and the second type of spacers may be of the same material but may be provided with different shapes in order to provide at least the first and the second winding portions with different stiffnesses. As an example, hollow spacers 130 may provide a reduced stiffness as compared to solid spacers 130.

Figure 9:
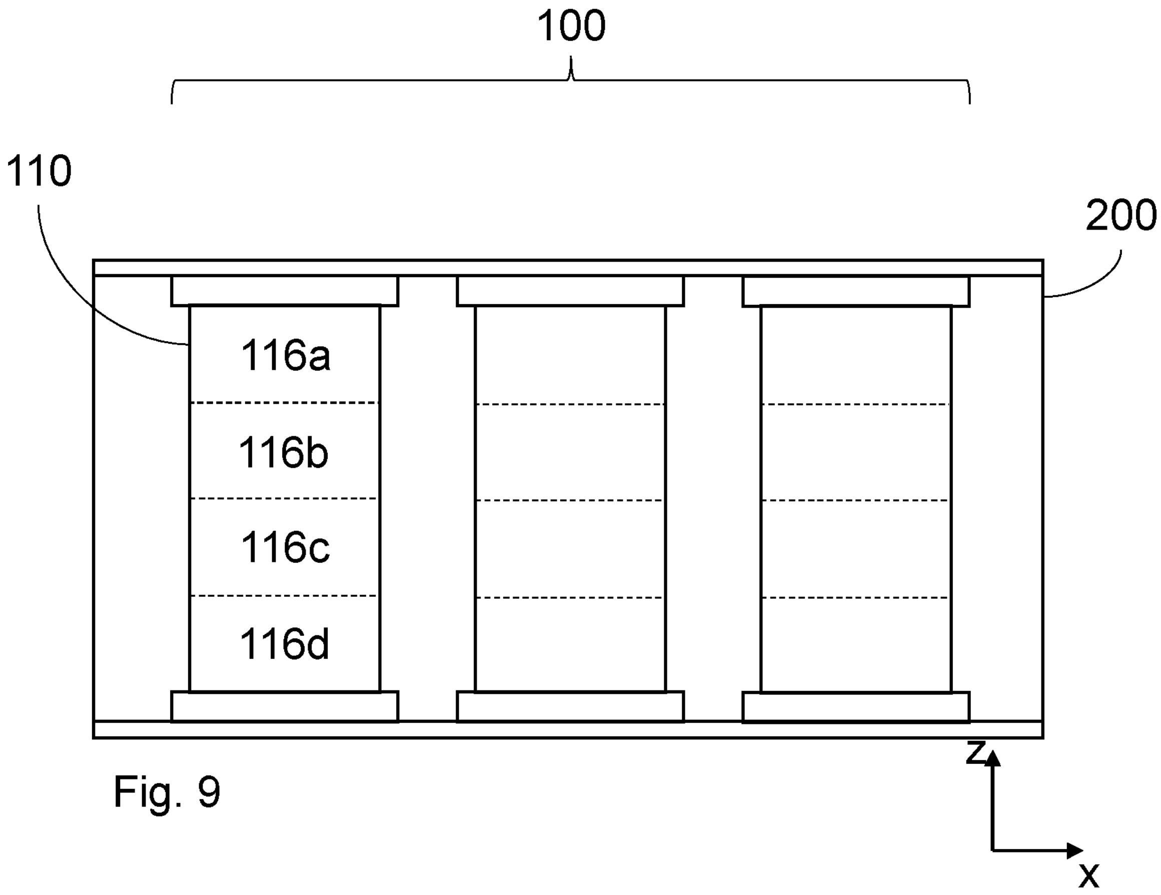
FIG. 9 shows side view cross-section of a further exemplary winding according to the present disclosure, comprised in a transformer.

FIG. 9 illustrates an exemplary configuration of a winding according to the present disclosure, wherein the first winding portion **116*a* is located at a different axial position as seen along the coil axis in relation to the second winding portion 116*b*. In addition, a third winding portion 116*c* and a fourth winding portion 116*d* have also been provided at different axial positions along the coil axis. It should be noted that if the winding 110 comprises an inner and an outer winding, both windings, or only one of the inner and outer winding, may comprise winding portions located at different axial positions as seen along the coil axis in relation to each other. Also, a transformer 100 according to the present disclosure comprises at least one winding 110 according to the present disclosure. In other words, the transformer 100 may have one or more windings 110 provided with a plurality of winding portions 116. In the example illustrated in FIG. 9, all three windings 110 have an identical configuration of winding portions according to the present disclosure. A different transformer 100, still according to the present disclosure, may have one winding 110** comprising a plurality of winding portions, whereas the other two windings are conventional windings.

Figure 10:
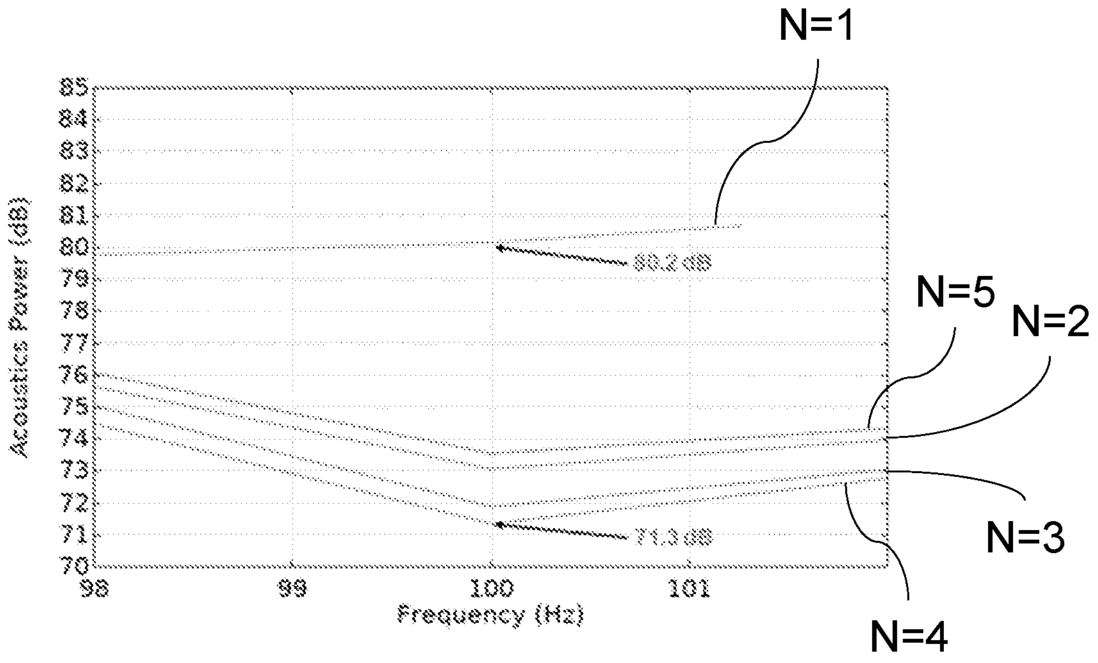
FIG. 10 shows simulation results of the exemplary windings of FIG. 9.

By way of example, an optimization study used different types of spacers 130 to assign a different modulus of elasticity to different configurations of winding portions, i.e., different numbers of winding portions 116, and different axial positions of the winding portions 116 in relation to each other, along the coil axis. FIG. 10 shows simulation results of the study for five different winding configurations, where the number, N, of winding portions 116 were varied from one winding portion to five winding portions along the coil axis. The curves show acoustic power radiated by a transformer arrangement 300 having a transformer tank 200 comprising a transformer 100, which in turn comprises three identical windings 110 according to the present disclosure. It can be seen that, in the illustrated example, N=4 yields the lowest acoustic radiation of 71.3 dB from the transformer tank 200 at the main frequency of 100 Hz. In comparison, at N=1, i.e., in which the stiffness or mass of the winding(s) is evenly distributed along the coil axis, similar to a conventional winding, the acoustic power is 80.2 dB at the main frequency of 100 Hz.

Figure 11:
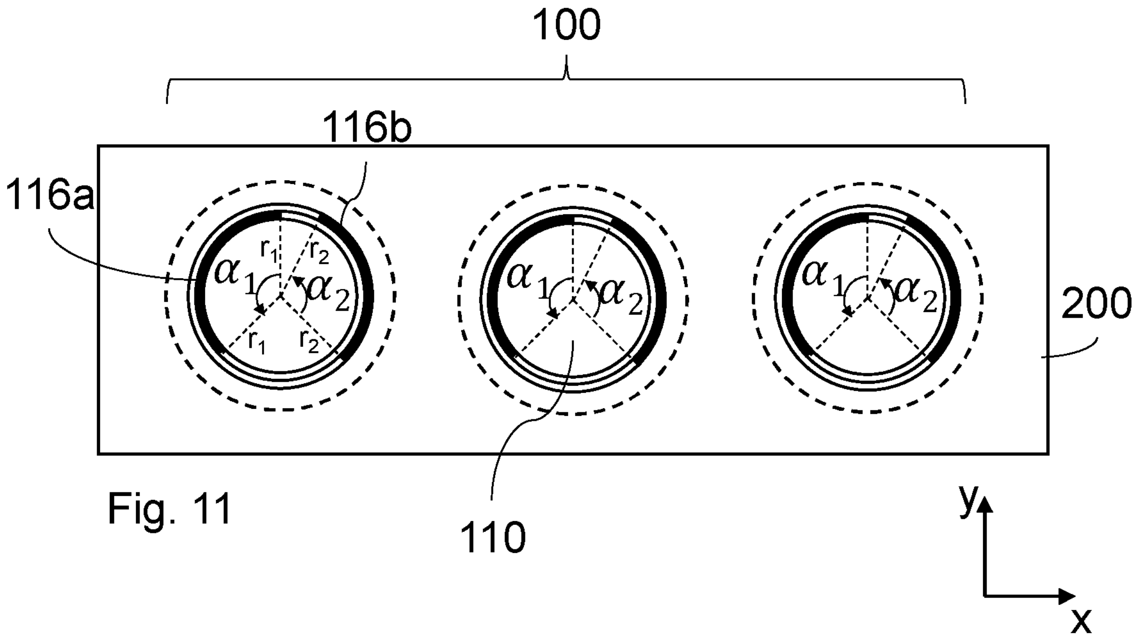
FIG. 11 shows a top view cross-section of a further exemplary winding according to the present disclosure, arranged in a transformer.

FIG. 11 shows another exemplary configuration of windings 110 according to the present disclosure. Herein, the first winding portion 116*a* is located in a different sector of the winding 110 than the second winding portion 116*b*. As an example, the inner winding comprises the first winding portion 116*a* and the outer winding comprises the second winding portion 116*b*. All the three windings 110 of the illustrated transformer 100 are illustrated as identical in this example, but as described hereinabove, the windings 110 may have different configurations of winding portions 116, in relation to each other.

An arc length of a winding portion sector is determined by a center angle $\alpha$ at the coil axis, between two radii r extending between the coil axis and the coil turns of the winding portion. The first winding portion 116*a* may have a different arc length as compared to the second winding portion 116*b*. Arranging the first winding portion 116*a* and the second winding portion 116*b* in different sectors of the winding 110 is another way of breaking the structural symmetry of the winding 110. In the illustrated examples the first winding portion 116*a* is defined by the central angle $\alpha_1$ and the radii $r_1$. The second winding portion 116*b* is defined by the central angle $\alpha_2$ and the radii $r_2$. The winding portions 116 may also have an axial length along the coil axis. In the example of FIG. 11, the axial lengths of the winding portions are equal to the length of the winding (not shown).

Figure 12:
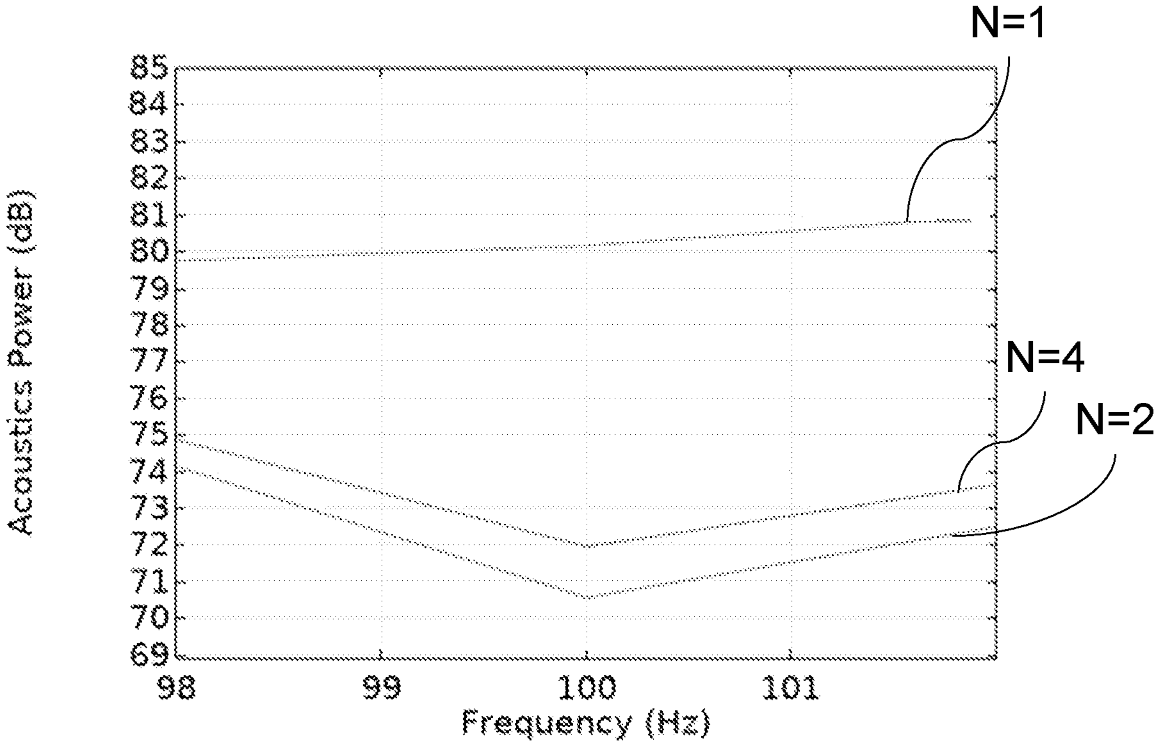
FIG. 12 shows simulation results of the exemplary windings of FIG. 11.

In another exemplary optimization study, shown in FIG. 12, winding portions 116, located in different sectors of the winding 110, were each assigned with spacers 130 having a certain modulus of elasticity. Simulation results of the study for three different winding configurations, where the number, N, of winding portions 116 were studied at one, two or four winding portions 116. The curves show acoustic power radiated by a transformer arrangement 300 having a transformer tank 200 comprising a transformer 100, which in turn comprises three identical windings 110 according to the present disclosure. It can be seen that, in the illustrated example, N=2 yields the lowest acoustic radiation of 70.5 dB from the transformer tank 200 at the main frequency of 100 Hz. In comparison, at N=1, i.e., in which the stiffness or mass of the winding(s) is evenly distributed along the coil axis, similar to a conventional winding, the acoustic power is 80.2 dB at the main frequency of 100 Hz.

It follows from the above examples, that different winding portions 116 may be located in different axial sections along the coil axis and at the same time be located in different sectors. Worded differently, the examples of FIG. 9 and FIG. 11 may be combined, for instance such that the first winding portion 116*a* and the second winding portion 116*b* of FIG. 11 have limited extensions along the coil axis and are located at different axial positions as seen along the coil axis.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A winding for a phase winding of a transformer, said winding having coil turns around a coil axis, said winding being adapted to transform voltage in a transformer at a predetermined frequency, when said transformer is operating, said winding is excited by a mechanical load having a main frequency corresponding to said predetermined frequency multiplied by two and having vibration modes, wherein the combination of load and vibration modes results in a vibration of said winding, said winding having a set of vibration modes, each vibration mode having a vibration mode frequency, wherein at least one main contributing vibration mode of the set of vibration modes is the vibration mode resulting in the largest acoustic power, of said vibration modes, when the winding is excited by said load, wherein the winding comprises a plurality of winding portions, said plurality of winding portions comprising at least a first winding portion and a second winding portion, wherein said first winding portion has a first winding portion stiffness and said second winding portion has a second winding portion stiffness, wherein a stiffness difference between said first winding portion stiffness and said second winding portion stiffness is such that the acoustic power is minimized at said main frequency, and wherein the first winding portion is located in a different sector of the winding than the second winding portion, and wherein the first winding portion is located in a sector of the winding delimited by a first center angle and wherein the second winding portion is delimited by a second center angle, wherein a respective sector is delimited by a circumferential arc length around the coil axis, which arc length is determined by the respective first and second center angles between two radii extending between the coil axis and the coil turns of the respective first and second winding portions.

2. The winding according to claim 1, wherein said first winding portion has a first winding portion stiffness, as seen along said coil axis, and said second winding portion has a second winding portion stiffness, as seen along said coil axis, said first winding portion stiffness being different from said second winding portion stiffness.

3. The winding according to claim 1, wherein the winding is provided with a plurality of spacers between the coil turns, and wherein the first winding portion is provided with a first spacer distribution and the second winding portion is provided with a second spacer distribution, said first spacer distribution being different from said second spacer distribution.

4. The winding according to claim 1, wherein said first winding portion is located at a different axial position as seen along the coil axis in relation to the second winding portion.

5. The winding according to claim 3, wherein the first spacer distribution comprises a first type of spacers and the second spacer distribution comprises a second type of spacers, said the first type of spacers being different from said second type of spacers.

6. The winding according to claim 5, wherein the first type of spacers has a first modulus of elasticity, and the second type of spacers has a second modulus of elasticity, said first modulus of elasticity being different from said second modulus of elasticity.

7. A transformer comprising at least one winding according claim 1.

8. A transformer arrangement comprising the transformer according to claim 7, wherein the transformer is enclosed in a transformer tank.

* * * * *